A. SAUNIER.
VEHICLE WHEEL.
APPLICATION FILED AUG. 19, 1912.
1,084,299.
Patented Jan. 13, 1914.
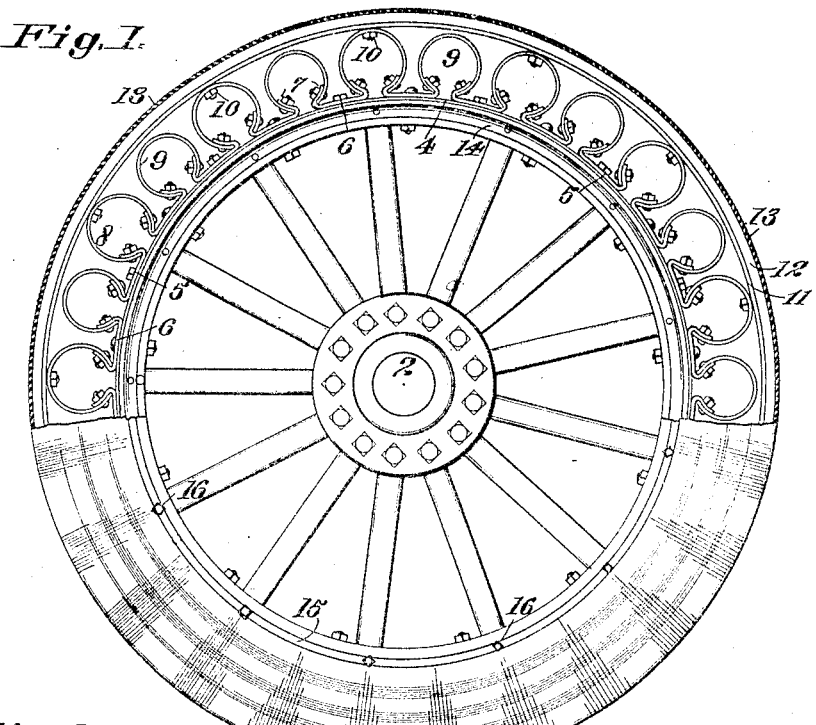
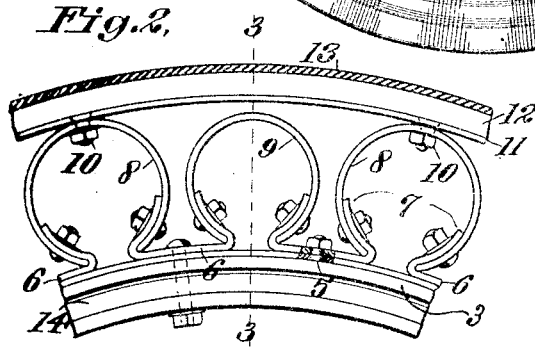
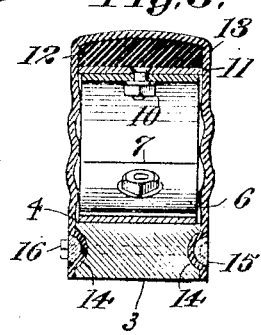
WITNESSES:
Charles Pickles
Frances V. Cole
INVENTOR
August Saunier,
BY G. H. Strong
ATTORNEY

UNITED STATES PATENT OFFICE.

AUGUST SAUNIER, OF SAN FRANCISCO, CALIFORNIA.

VEHICLE-WHEEL.

1,084,299.  Specification of Letters Patent.  Patented Jan. 13, 1914.

Application filed August 19, 1912. Serial No. 715,845.

*To all whom it may concern:*

Be it known that I, AUGUST SAUNIER, a citizen of the United States, residing in the city and county of San Francisco and State of California, have invented new and useful Improvements in Vehicle-Wheels, of which the following is a specification.

This invention relates to vehicle wheels.

The object of the present invention is to provide a vehicle wheel involving details of construction designed to afford a resiliency in the wheel substantially as efficient in yieldability as the ordinary pneumatic tire, and which wheel consists of inner and outer relatively movable parts substantially connected by flexible cushions or springs adapted to permit an eccentric movement of the wheel center with relation to the tread.

The invention consists of a flexible tread member, a floating central wheel, and alternately contacting springs in combination with springs constantly in engagement with the rim of the wheel.

It also comprises details of construction which will be more fully explained by reference to the accompanying drawings, in which—

Figure 1 is a side elevation partly in section of the improved wheel. Fig. 2 is a side elevation of an enlarged detail of Fig. 1. Fig. 3 is a cross section on line 3—3 of Fig. 2.

My improved wheel comprises in the present embodiment a central floating hub portion 2, having a substantial felly 3 which may be circumscribed by a reinforcing band 4. Appropriately connected to the band 4, as by bolts 5, is a series of circumferentially spaced clips 6 having upwardly convergent ends 7, to the adjacent faces of which are bolted arcuate springs 8 and 9, the axes of which are transverse to the wheel.

Upon alternate of the springs, as 8, for instance, there is arranged and connected by bolts 10, or other equivalent devices, a continuous tread or rim portion composed of a flexible, metallic, flat ring 11, imposed upon which is a cushion of rubber or some equivalent 12; the latter being incased by a flexible fabric or material 13, such as leather, which is continued over the sides of the wheel and extended down to the felly 3, which is shown as provided on its opposite faces with grooves 14 in which the incasing material 13 is secured by clamp rings 15, through which may extend fastening devices, as bolts 16.

The tread portion, consisting of the parts 11, 12 and 13, of the wheel is spaced from the central portion by the alternate springs 8, while the other alternate set of springs, as 9, are of somewhat less diameter than the springs 8 and, therefore, do not normally engage or contact with the inner surface of the ring 11. When the wheel is revolving and subjected to a load, the spring 8 of greater diameter will yield, as will also the lower portion of the tread 11 which is flexible, whereupon the tread will approach and bear upon the surface of the outer portion of the springs 9, which latter then become operative to bear a part of the load.

From the peculiar construction and arrangement of parts it will be seen that the wheel consists of a flexible tread constantly supported, with relation to the central floating wheel portion, by a series of springs, as 8, of relatively larger diameter than the intermediate springs 9, and that when the wheel is in operation in certain running conditions, or load encountered, the supporting springs 8 are assisted by the coming into play of the auxiliary springs 9 as these pass below the level of the center of the wheel. For instance, if a vehicle is running over smooth roads or streets with a light load, it may be that only the springs 8 will be operative in carrying the load, but at certain times, as when irregularities of roadway or increase in the load occur, then the springs 8 will yield and the flexible tread portion will bend sufficiently to bring the auxiliary springs 9 into play and assist in carrying the load imposed.

It will be seen that, by virtue of the direct connection with the hoop-shaped spring, as 8, with the tread member and with the felly member, these two will have a limited differential movement, and that power may be transmitted from the central floating wheel member through the springs to the tread member when the wheel is a driver.

Having thus described my invention, what I claim and desire to secure by Letters Patent is—

The combination in a vehicle wheel, of a central floating wheel member, an exterior tread member, a series of spaced arcuate springs, all of which are rigidly connected both to the inner and outer members, and a second series of springs alternating with the first-named springs and connected only to the inner member and normally out of contact with said tread member, the tread member being adapted to engage said smaller springs when the load carried by the wheel is increased, each of said springs having each end detachably connected to the inner member by a clip, which clip is secured between its ends to the inner member, and the ends of the clips being bent outwardly convergently to overlap the ends of adjacent springs.

In testimony whereof I have hereunto set my hand in the presence of two subscribing witnesses.

AUGUST SAUNIER.

Witnesses:
 JOHN H. HERRING,
 ROBERT R. RUSS.